United States Patent [19]

Everett

[11] Patent Number: 4,498,294

[45] Date of Patent: Feb. 12, 1985

[54] BUOYANCY PRIME MOVER WITH PRESSURE CONTROL MEANS

[76] Inventor: Thomas D. Everett, 1144 E. Washington Blvd., Lombard, Ill. 60148

[21] Appl. No.: 408,767

[22] Filed: Aug. 17, 1982

Related U.S. Application Data

[63] Continuation-in-part of Ser. No. 260,390, May 4, 1981, Pat. No. 4,363,212.

[51] Int. Cl.³ ............................................. F03G 7/00
[52] U.S. Cl. ........................................ 60/496; 415/7
[58] Field of Search ............... 60/496, 495; 290/1 R; 415/7; 417/337

[56] References Cited

U.S. PATENT DOCUMENTS

| 124,843 | 3/1872 | Millard. | |
|---|---|---|---|
| 211,143 | 1/1879 | Fogarty. | |
| 212,186 | 2/1879 | Burwell. | |
| 2,037,973 | 4/1936 | Grondahl | 60/22 |
| 3,194,008 | 7/1965 | Baumgartner | 60/22 |
| 3,918,827 | 11/1975 | Conn et al. | 415/5 |
| 3,934,964 | 1/1976 | Diamond | 415/7 |
| 4,038,826 | 8/1977 | Shaw | 60/641 |
| 4,054,031 | 10/1977 | Johnson | 60/496 |

Primary Examiner—Stephen F. Husar
Attorney, Agent, or Firm—Dressler, Goldsmith, Shore, Sutker & Milnamow, Ltd.

[57] ABSTRACT

A buoyancy prime mover that converts the potential energy of a gas buoyant within a liquid into rotating mechanical energy comprises a plurality of rigid or collapsible buckets joined by one or more chains with rotatable sprockets and shafts to form a continuous loop within an enclosure and means for controlling the pressure within the enclosure whereby the buoyant gas is trapped within the buckets, the buckets rise through the liquid and rotate the chain and sprockets to generate power.

9 Claims, 8 Drawing Figures

BUOYANCY PRIME MOVER WITH PRESSURE CONTROL MEANS

CROSS REFERENCE TO A RELATED APPLICATION

This application is a continuation-in-part of my copending application Ser. No. 260,390 filed May 4, 1981, entitled "Buoyancy Prime Mover", now U.S. Pat. No. 4,363,212.

BACKGROUND OF THE INVENTION

The present invention relates to the generation of power by buoyant forces and particularly to an enclosed apparatus that converts the potential energy of a gas buoyant within a liquid into rotating mechanical energy.

When a gas is introduced into a liquid that is more dense than the gas, the buoyant forces acting on the gas will cause the gas to rise. If a container is placed in the path of the rising gas, the gas will enter the container and displace an equal volume of liquid from the container. According to Archimedes' principle, this will create a force of buoyance ($F_B$) in the bucket equal to the weight of the displaced liquid.

A practical use of this principle involves attaching a plurality of buckets to a chain or belt to form a continuous loop. The buckets can move in a vertical direction upwards or downwards through the liquid. That configuration is well known to those skilled in the art. However, the efficient use of the buoyant forces developed requires an apparatus that minimizes any non-vertical movements of the buckets and provides for the rapid entry of gas into the buckets in addition to the rapid displacement of liquid from the buckets. The present apparatus and the apparatus of my copending application are directed to this problem of efficient power generation.

DESCRIPTION OF THE PRIOR ART

The prior art includes many examples of machines comprising buckets joined by chain assemblies which can be immersed in water to generate power. The following references constitute the closest prior art of which applicant is aware.

U.S. Pat. No. 124,843 to Millard discloses buckets arranged to form a continuous loop. The buckets are moved downwardly by the action of gravity upon the water which creates an unbalanced force and rotates a series of sprockets and a connected shaft. This is a form of bucket elevator that has been used in many forms over the years. The Millard apparatus includes buckets at the upper end of the loop which are completely exposed to the atmosphere. The buckets of the present invention, however, must be at least partially immersed in the liquid for efficient power production.

U.S. Pat. No. 211,143 to Fogarty shows a turbine rotated by a wheel to harness buoyant forces. The Fogarty apparatus, as will be demonstrated, is very inefficient when compared to the present invention. Gas enters the liquid and rises into the lowest bucket of the wheel to displace a volume of liquid. Fogarty, however, does not provide for the efficient movement of gas and liquid during that transfer. Such a provision is fundamental to the operation of the present invention. The force of buoyancy ($F_B$) created by the gas in the liquid causes the Fogarty wheel to rotate about its axis. When the lowest bucket is completely filled with gas, that bucket will begin to displace the gas as soon as the wheel rotates from the lowest position. This gas escape or spillage will continue at an increasing rate as the wheel turns. At approximately 120° of rotation, the lowest bucket is totally devoid of gas so that power is being generated inefficiently during the cycle.

The present invention recognizes that a certain energy input is necessary to introduce the gas into the liquid. This gas is captured, retained and fully utilized during its rise in the liquid to make better use of the energy input than does the Fogarty device. Note also that the Fogarty device uses only about 33% of the buckets at one time while the present invention can use up to 49% of the buckets (depending upon depth of liquid and the bucket size used).

An additional feature that is fundamental to the present invention is the natural expansion of the gas as it rises in the liquid (due to a continually decreasing liquid pressure). As the gas expands, more liquid is displaced so that the $F_B$ acting on each bucket constantly increases during the rise. As a result, the bucket speed tends to increase, and the effect is more pronounced as the length of continuous loop of buckets is increased.

The preferred design of the present invention directs only enough gas into a bucket so that, as the bucket rises and the gas expands, the gas completely displaces the liquid in the bucket when the bucket reaches liquid level. Thus, the energy input is not wasted as gas slippage from the bucket which would be the case if the volume of the expanded gas became greater than that of the bucket during the vertical rise. This concept is not disclosed by the Fogarty reference.

U.S. Pat. No. 212,186 to Burwell shows an apparatus that is similar to the present invention in that it uses vertically linked chains acting on sprockets. The Burwell buckets, however, are very different from those of the present invention. In addition, Burwell uses the weight of water as the principal moving force and does not mention or use the force of buoyancy. Burwell notes that the top sprocket is above the liquid level. The present invention uses a top sprocket that may be partially or totally immersed in the liquid.

U.S. Pat. No. 2,037,973 to Grondahl discloses a continuous loop apparatus for power generation. The Grondahl apparatus, however, requires a continual replenishing of the liquid. This tends to make the device non-portable; whereas, portable use is a prime consideration for the present invention. In addition, Grondahl does not use buckets in which gas is inserted to harness buoyancy forces; instead, airtight compartments or floats are used.

U.S. Pat. No. 3,194,008 to Baumgartner discloses a device that uses a ring or circular wheel and a friction drive to transfer power to an output shaft. The present invention can use friction drive or positive drive quite readily. That limitation of the Baumgartner invention is significant because frictional drives are very inefficient and limited in their ability to transmit torque. A friction drive also produces high wear points relative to gears or sprockets with chains. Baumgartner also uses a governor device to control speed. The present invention simply increases or decreases the amount of gas admitted to the buckets to control speed.

U.S. Pat. No. 3,918,827 to Conn shows a water pressure machine that does not feed a gas continuously into buckets to obtain buoyant forces, rather buoyant panels are used. Note that when these panels are descending, the total unbalanced force that is developed must be great enough to drive the buoyant panels downward against the buoyant force. The energy used to drive or push the buoyant panels downward decreases the energy produced on the rising side. The present invention uses buoyant forces only on the rising side of the chain. During the descent, the buckets are filled with liquid or are collapsed into a flat configuration and the buckets need not be driven downward against buoyant forces.

Conn does not address the friction and turbulence created on the rising side of the bucket chain by moving flat surfaces through the liquid. The present bucket design and arrangement, however, greatly minimizes these countervailing forces. The frictional resistance to flow of the buckets can reduce the bucket speed. The bucket design and arrangement of the present invention minimizes these forces of resistance while optimizing the harnessing of buoyant forces to provide for greater energy efficienty.

In addition, the present device uses the natural expansion of a rising gas. This requires a bucket that is closed on all sides but one. The gas can expand within the buckets and displace the liquid to create a greater buoyancy force as the buckets rise. The Conn bucket has a fixed displacement that does not change as the bucket rises or descends U.S. Pat. No. 3,934,964 to Diamond shows cylinders filled with a gas on one side of a vertical chain arrangement, while the gas is displaced on the other side of the chain. That general design is similar to the present invention. The Diamond apparatus uses a gravity-activated piston or a third fluid (mercury) to pump the gas through tubes from cylinders on the descending side of the continuous chain to cylinders on the rising side. By way of comparison, the buckets of the present invention act independently of each other and, other than collapsing, have no moving parts. The gas is fed into the present buckets by placing the source of gas directly below the buckets and allowing the gas to rise into the buckets. The Diamond piston assembly could severely restrict the speed of displacement which is a major consideration since rapid displacement is necessary to achieve any significant speed from a device of this nature. The ability to displace the gas and fluid rapidly is of fundamental importance to efficient power production.

Diamond does not emphasize streamlining or nesting the cylinders to present a solid wall rising and descending through the liquid. The joining tubes between cylinders would present practical limitations to displacement between cylinders, and would most certainly need replacement due to wear. The use of pistons in the cylinders is quit different from using open buckets without pistons.

Applicant also incorporates by reference the U.S. and foreign patents cited during the prosecution of the copending application. Of those references, the following are of particular interest.

U.S. Pat. No. 4,054,031 to Johnson discloses a power unit having an endless belt immersed in a tank of water and disposed about parallel upper and lower rotatable rollers so that the belt frictionally engages and rotates the rollers as collapsible buckets are buoyantly moved through the water. Those buckets, however, do not cooperate or nest within one another to reduce the level of turbulence and friction as the buckets move through the liquid. Moreover, means for controlling the pressure within the water tank is not provided.

U.S. Pat. No. 4,038,826 to Shaw discloses the use of a refrigerant as a source of gas to rotate an endless arrangement of cups or buckets, and the recycling of the refrigerant in a closed system. But, like the other devices of the prior art, the buckets do not nest within one another to reduce turbulence. In addition, Shaw does not control the pressure within the enclosure in the space over the liquid and, therefore, the buoyant forces exerted on the buckets.

Accordingly, there are many devices described in the prior art for the generation of power by harnessing a rising gas in a fluid. Some devices are quite primitive, while others reflect the current state of the art. The prior art, however, does not disclose the embodiments of the present invention.

SUMMARY OF THE INVENTION

The present invention relates to a buoyancy prime mover that converts the potential energy of a gas buoyant within a liquid into rotating mechanical energy and which includes means for controlling the pressure of the gas. A prime mover, as the term is used herein, is an initial source of motive power designed to receive and modify a force as supplied by a natural source and apply that force to drive machinery.

A gas is introduced at a given depth into a body of liquid held within an enclosed container. The rising gas is directed into inverted buckets that are linked together by one or more chains to form a continuous loop. The buckets can be rigid or collapsible. When the gas enters a bucket, an equal volume of liquid is displaced from the bucket. The trapped gas in each bucket exerts a vertical force of buoyancy ($F_B$) on the bucket equal to the weight of the displaced liquid. Sprockets or pulleys, which guide the chain-bucket assembly and convert the linear motion of the chain into rotational motion, engage the chains at the top and bottom of the continuous loop. The sprockets are rotatably connected to supporting shafts which rotate on bearings with the sprockets. The chain-bucket assembly is mounted within the enclosure to provide the necessary stability.

Because the gas rises vertically through the liquid, the only movement of the buckets should be in a vertical direction for optimum use of the buoyancy force ($F_B$). Any nonvertical bucket movement will produce a horizontal vector component of $F_B$ which would reduce the efficiency of the apparatus. Therefore, the present invention includes two parallel, vertical columns of the buckets evenly spaced on a chain to reduce vibration and to increase power input. One column moves upwardly as the buoyant forces act on the buckets. The buckets on the other column descend into the liquid. The gas is displaced from the buckets so that the upwardly directed buoyant force causes the loop to rotate in the direction of the buoyant force. A constant supply of gas produces a continuous bucket motion around the sprockets, and the total buoyant force at a given time is equal to the sum of the component buoyant forces in each bucket.

The constant gas supply is generated in a closed system whereby the gas is released into an open space over the liquid in the enclosed container to be condensed, pressurized and recirculated for reuse in the system. By controlling the pressure of the gas in the open space over the liquid, the buoyant forces acting on the buckets and, therefore, the energy output of the apparatus can be regulated.

BRIEF DESCRIPTION OF THE DRAWINGS

FIGS. 5A and B are side views of a liquid entry valve to show the operation thereof;

DETAILED DESCRIPTION OF THE INVENTION

Figure 1:
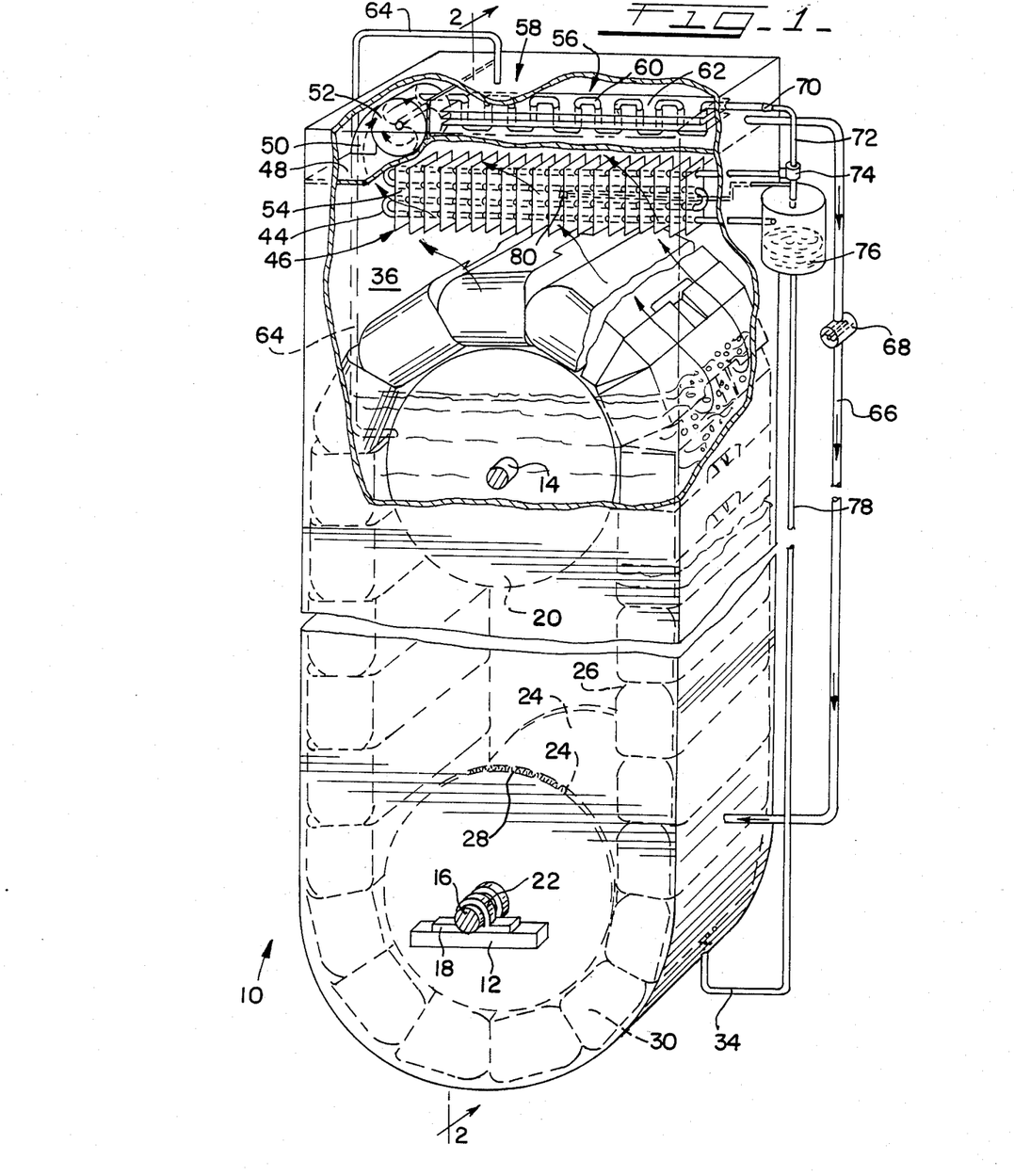
FIG. 1 is a perspective view of an embodiment of the present invention having rigid buckets.

Referring to FIG. 1, the apparatus of the present invention is supported within an enclosure shown in part and indicated generally by the reference numeral 10. The enclosure is adapted to contain a liquid, such as water, and includes beams 12 which support top and bottom shafts 14 and 16, respectively, that function to transfer the energy produced by the apparatus to the intended use. Bearing housings 18 contain bearings (not shown) to encircle the shaft and permit relatively friction-free shaft rotation. Both the top and bottom shafts should be positioned below the surface of the liquid.

Attached to the top shaft 14 is a set of upper sprockets 20 which rotate with the top shaft. A locking collar 22 fixes the position of each sprocket on the respective shaft. The upper sprockets can be adapted to rotate freely about the top shaft 14, but that would not enable power to be transferred from the top shaft. The sprockets 20 on the top shaft 14 are connected to a corresponding set of lower sprockets 24 on the bottom shaft 16 by roller-type chains 26 which engage teeth 28 on each sprocket so that each chain forms a continuous loop. The sprockets 20 and 24 must firmly engage the chain 26 to maintain a sufficient chain tension so that the chain does not slip from the sprocket teeth 28 (see FIG. 3).

In addition, it is desirable to have a fixed end and an adjustable end of the assembly within the enclosure 10 to enable the tightening of chains which have loosened from wear and stretching. In preferred practice, the bottom shaft 16 of the frame assembly is fixed, while the top shaft 14 is adjustable to take up any chain slack. A number of chain tightening devices are suitable for use with the present invention; for example, constant-force helical springs positioned under the top shaft bearing housings 18 could function to maintain tension and tighten chains.

Figure 2:
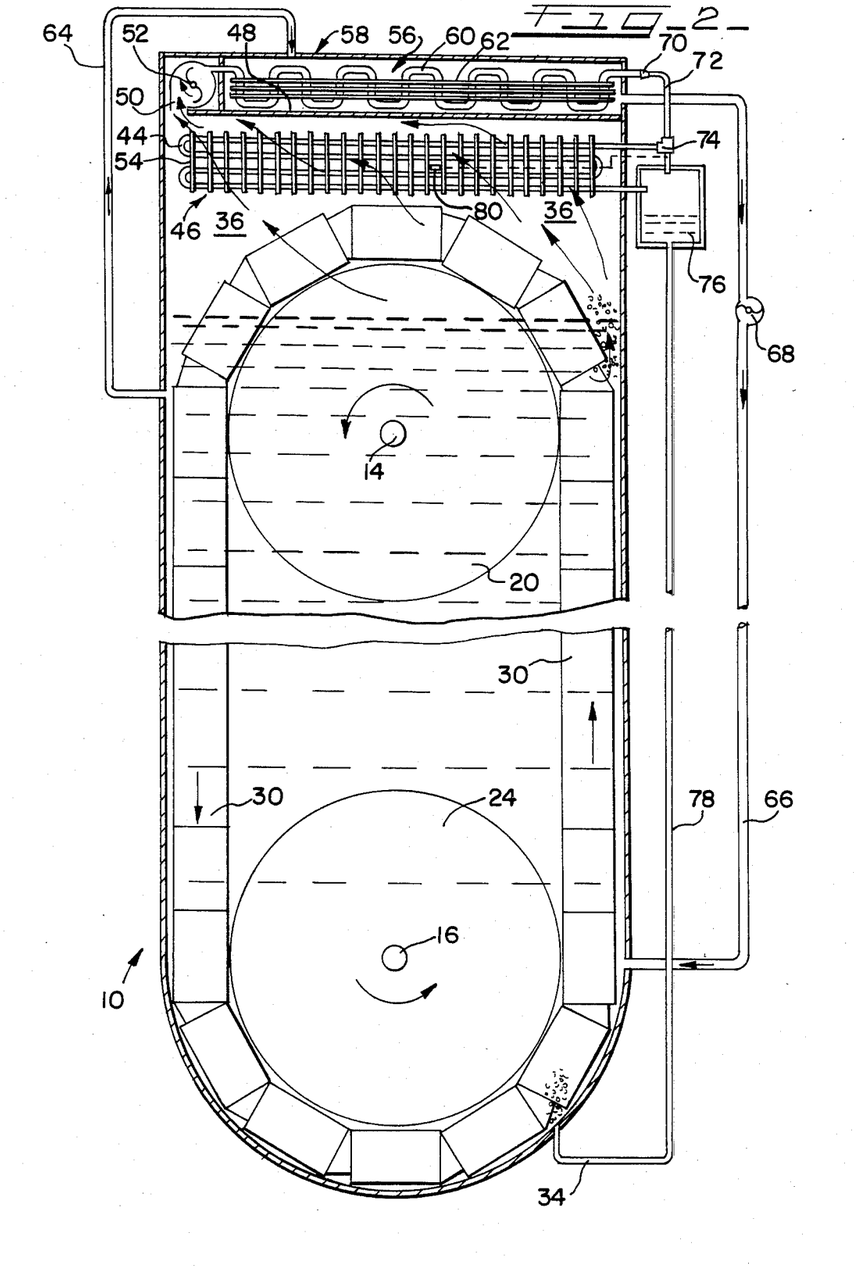
FIG. 2 is a sectional view taken along the line 2—2 of FIG. 1 but shows a second bucket design.

Located between a set of chains 26 is a plurality of buckets 30. Each bucket can be generally ovoid in horizontal cross section (as shown in FIG. 1) and is connected at each end to a chain 26 by a riveted link 32 (see FIG. 3). The buckets can also have a substantially rectangular cross-section with vertical side walls as shown in FIG. 2.

The buckets 30 comprise thin shelled containers of stamped metal or molded plastic which are capable of containing a gas or liquid. The bucket design must enable a plurality of buckets to pass through a liquid with minimum turbulence since the frictional resistance to flow of the buckets can reduce the chain speed and the efficiency of the apparatus. Therefore, streamlining or nesting one bucket within an adjacent bucket to form a solid wall that flows through the liquid is a fundamental aspect of the present invention.

Gas is admitted into each bucket 30 near the lower sprockets 24 through an inlet tube 34. The inner wall of the enclosure 10 acts as a deflecting plate to direct the rising gas towards the buckets. Because the gas rises vertically through the liquid, the only movement of the buckets should be in a vertical direction for optimum use of the buoyancy force ($F_B$). Any nonvertical bucket movement will produce a horizontal vector component of $F_B$ which would reduce the efficiency of the apparatus. Therefore, the chains 26 form a continuous loop having two parallel, vertical columns of the buckets evenly spaced on the chain to reduce vibration and to increase power input. One column moves upwardly as the buoyant forces act on the buckets. The buckets on the other column descend into the liquid. The liquid is displaced from the buckets at the bottom sprockets so that the upwardly directed buoyant force causes the continuous loop to rotate in the direction of the buoyant force. A constant supply of recirculating gas produces a continuous bucket motion around the sprockets 20 and 24, and the total buoyant force at a given time is equal to the sum of the component buoyant forces in each bucket.

The constant gas supply is generated in a closed system whereby the gas is released into an open space 36 over the liquid in the enclosed container or enclosure 10 to be condensed, pressurized and recirculated for reuse in the system. By controlling the pressure of the gas in the open space 36 over the liquid, the buoyant forces acting on the buckets 26 and, therefore, the energy output of the apparatus can be regulated.

Figure 3:
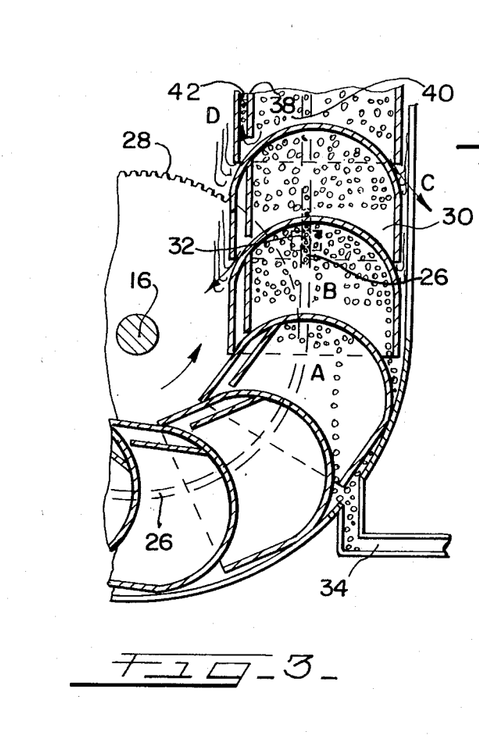
FIG. 3 is a detailed sectional view of the gas inlet portion of the invention.

The operation of the present invention and the recirculation of the gas will now be described with reference first to FIG. 3 and then FIGS. 1 and 2. After the gas passes through the inlet tube 34, a portion of the gas rises into a bucket A (FIG. 3) and the remainder of the gas passes between the side wall of the bucket A and the inner wall of the enclosure 10 to pass into a bucket B positioned above bucket A. As will be described, the buckets can be rigid or collapsible. When the gas enters a bucket, an equal volume of liquid is displaced from the bucket as shown diagrammatically by the arrows C. A predetermined volume of gas is admitted into the buckets to cause the buckets to rise through the liquid and rotate the chains about the sprockets 20 and 24 in the indicated counterclockwise direction. The sprockets convert the linear motion of the chains into rotational motion.

Fundamental to the present invention is the natural expansion of the gas as it rises in the liquid (due to a continually decreasing liquid pressure). The gas within each rising bucket will expand as the water pressure decreases at shallower depths of water. As the gas expands, more liquid is displaced so that the buoyant force acting on each bucket constantly increases during the rise. As a result, the bucket speed is increased; and the effect is more pronounced as the length of continuous loop of buckets is increased. Should the gas expand to the extent that the total gas volume exceeds the internal volume of the bucket, gas will be lost as it escapes over the bottom edge and the sides of the bucket. To avoid this problem, each bucket can be provided with a partition 38 that separates the interior of the bucket into two sections—a primary chamber 40 and a reserve chamber 42 (see FIG. 3). The expanding gas, rather than flowing over the bottom and sides of the bucket can pass from the primary chamber 40 into the reserve chamber 42 and thereby maintain the gas within the bucket.

In the operation of the present invention, only enough gas is admitted into each bucket so that, as the bucket rises and the gas expands, the gas completely displaces the liquid in the bucket when the bucket reaches liquid level. Thus, the energy input is not wasted as gas spillage which would be the case if the volume of the expanded gas became greater than that of the bucket.

Referring again to FIGS. 1 and 2, the buckets 26 are driven upwardly to the top of the liquid contained within the enclosure 10. At that point, the gas spills from each bucket into an open space 36 above the surface of the liquid as the bucket rotates to the descending side of the enclosure. Thereafter, the gas flows past coils 44 of a cooling unit 46 along a partition 48 and through a duct 50 and into a compressor 52 positioned at the upper end of the enclosure 10.

The cooling unit 46 lowers the temperature of the gas, which has the effect of increasing the gas density and condensing the vaporized liquid from the gas. The liquid condenses on the coils 44 and the associated plates 54 of the cooling unit 46 and falls by gravity into the body of liquid. The gas is then pulled through the compressor 52—the gas flow is indicated by arrows in FIGS. 1 and 2. The partition 48 functions to direct the gas to the duct 50 adjacent the compressor 52.

The compressor 52 converts the relatively cool, low pressure gas to a heated, high pressure gas which is forced into a condensing unit 56 comprising a housing 58 containing a coiled tube 60 with associated cooling plates 62. The housing 58 also contains a liquid, within which the tube 60 and plate 62 are immersed, to absorb the heat transferred from the heated gas to the condensing unit 56. The liquid is the same fluid contained in the enclosure 10. Specifically, the liquid is circulated between the enclosure 10 and the condensing unit 56 by conduits 64 and 66—conduit 64 directs the liquid from the enclosure 10 to the condensing unit 56 and conduit 66 returns the heated liquid from the condensing unit to the enclosure. A pump 68 provides the pressure for circulation.

As the gas is cooled during passage through the condensing unit 56, the gas is liquified. A narrowed outlet 70 at the distal end of the coiled tube 60 assists in liquifying the gas. The liquified gas is directed by a conduit 72 to a valve 74 in communication with the coils 44 of the cooling unit 46 and a reservoir 76.

Upon control of the valve 74, the reservoir 76 accumulates the liquified gas which is directed to the gas inlet 34 via conduit 78. A combination of the temperature and pressure of the liquified gas vaporizes the liquified gas upon passage through the gas inlet tube 34 into the enclosure 10.

The valve 74 also determines the volume of liquified gas flowing through the cooling unit 46. A thermostat 80 can be positioned within the cooling unit to control the valve 74.

During operation, the pump 68 and cooling unit 46 (with the valve 74) can be used to control the gas pressure within the open space 36 by varying (1) the gas flow from the open space 36 to the compressor 52 and (2) the temperature of the cooling unit 46. This will determine the pressure of the gas within the open space 36 and will directly affect the buoyant forces acting on each bucket 30. The displacement of the pump 68 can be controlled by conventional means including a variable speed electric motor.

Figure 4:
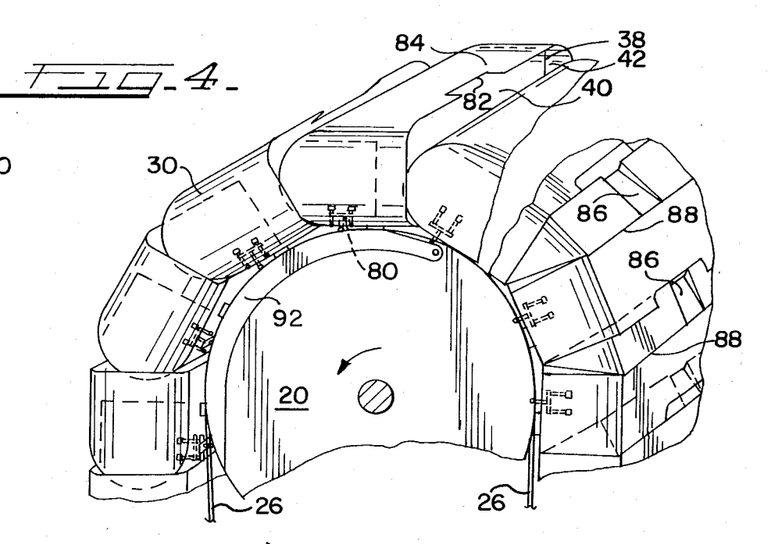
FIG. 4 is a perspective view of a third embodiment of the present invention having buckets with liquid entry valves, displacement ports and a gas entry guide.

Referring now to FIG. 4, an additional embodiment of the present invention is shown having buckets 30 with liquid entry valves 80 in the innermost wall of each bucket relative to the chain 26 and displacement ports 82 along the bottom edge 84 of the bucket. Also shown is a variation of the second embodiment that includes a gas guide 86 in the top of the bucket. Chains 26 are secured to the innermost bucket wall to permit rotation about the sprockets as previously described. The liquid entry valves 80 and displacement ports 82 could be used with buckets 30 as shown in FIGS. 1 and 2 provided the chains 26 are secured to the innermost bucket wall rather than to the bucket sides. In addition, this embodiment can include a partition 38 along each side of the bucket to form a primary chamber 40 and reserve chambers 42, also as previously described.

A ridge 88 along the top of the bucket 30 provides a surface for the bucket to join with the bottom edge 84 of a preceding bucket and form an ascending and descending column of joined or nested buckets which move through the liquid with minimum turbulence. The ridge also restricts the twisting effect of the buckets relative to the chain 26 which can be produced as the buckets pass through the liquid. This reduces horizontal bucket motion and therefore increases the efficiency of the apparatus.

The displacement ports 82 are cutaway sections along the bottom edge 84 of the bucket 30 which allow liquid to exit from the bucket as the gas expands on the ascending side of the apparatus. Note that the innermost edge of the cutaway section forming the displacement port 80 must not be coplanar with the top of the partition 38 that separates the primary chamber 40 and the reserve chamber 42. If the two were coplanar, especially as measured on the innermost wall of the bucket where the displacement port must extend the full length of the bucket so that the bucket can swing clear of a following bucket during rotation about the sprockets 20 and 24, gas that expanded in the primary chamber 40 as the bucket rose through the liquid would pass from the bucket through the displacement port rather than into the reserve chamber 42. The gas spillage, of course, is of less concern on the outermost wall of the bucket since in preferred practice the displacement port on that bucket wall extends along only part of the bottom bucket edge 84. The ports 82 also permit the liquid to flow from the bucket as the gas enters at the lower sprockets 24.

The gas guide 86 is an indentation formed in the top of the bucket 30 to direct gas from the inlet tube 34 at the lower sprockets 24 into the preceding bucket on the chain 26. The guide 86 also serves as a passage through which gas can escape with minimum turbulence from the preceding bucket as liquid enters that bucket at the upper sprockets 20.

Figure 5:
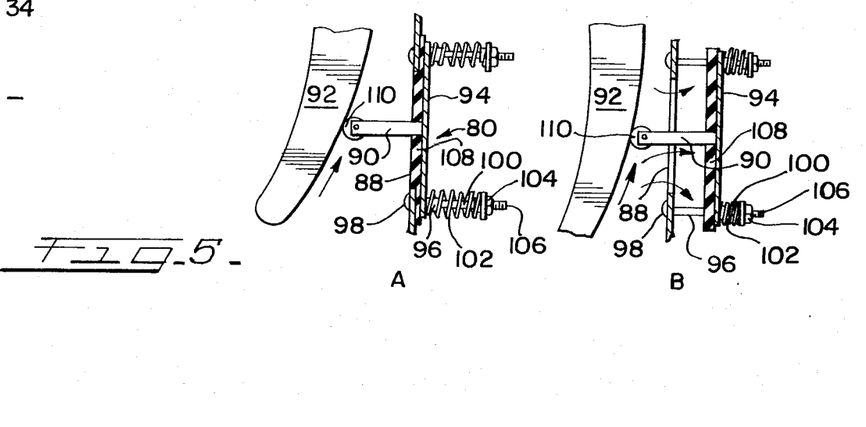

The liquid entry valve 80 (see FIG. 5) is a spring-loaded device that covers an opening 88 in the side of each bucket 30. The valve 88 acts to increase the speed of the liquid-gas displacement as the buckets revolve about the upper sprockets 20. As indicated in FIG. 4, an extending member 90 of the liquid entry valve is adapted to engage a cam 92 positioned about each upper sprocket 20. The cam 92 is arcuate-shaped and has the same outer radius as the radius of the upper sprockets 20. The engagement of the extending member 90 with the cam 92 opens the valve 80 and allows liquid to flow into the bucket 30. A similar cam could be positioned about each lower sprocket 24 to engage the displacement of the liquid from the bucket as the bucket is filled with gas. The length of the working surface of the cam 92 determines the time that the liquid entry valve 80 is open. Therefore, when the gas filled buckets round the upper sprockets 20, liquid is admitted into the buckets at two points—over the bottom edge 84 of the bucket and through the opening 88 in the side of the bucket. A rapid liquid-gas displacement is critical to the efficient operation of the apparatus, and all gas must be removed from each bucket before the bucket passes the upper sprockets 20 and descends through the liquid.

Without the liquid entry valve 80, all liquid would enter the bucket through the displacement port 82 over the bottom edge of the bucket. While the displacement port and the bottom bucket edge may cooperate to form an adequate displacement means when the chain rotates slowly, at high speeds of rotation the liquid-gas displacement may not be completed when the bucket is submerged on the descending side of the apparatus. Any gas trapped in a descending bucket would create an upwardly directed force acting in opposition to the buoyant forces on the ascending side of the apparatus.

Referring again to FIG. 5, the valve 80 comprises a plate 94 which covers the opening 88 in the side of the bucket. The plate 94 is connected to the bucket 30 by a set of threaded bolts 96, each having a head 98 that is welded or bonded to the exterior surface of the bucket. The shaft 100 of each bolt 60 extends into the bucket. A spring 102 is positioned around each shaft 100 and is held in place by a stop nut 104 secured in a fixed position on the threaded end 106 of the shaft 100. A seal or gasket 108 can be placed between the plate 94 and the inside surface of the bucket wall. As further shown in view A of FIG. 5, the extending member 90 which includes a rotatable disk 110 is secured to the plate 94. As the buckets revolve, the rotatable disk 110 can engage the cam 92 of each upper sprocket 20. The cam 92 forces the extending member 90 and the plate 94 into the bucket to allow liquid to flow through the opening 88. When the bucket 30 completes the rotation about the upper sprockets 20 and enters the descending side of the chain, the springs 102 about each bolt shaft 100 compress the plate 94 and the seal 108 against the inner wall of the bucket as the rotatable disk 110 and the extending member 90 disengage contact with the cam 92.

Figure 6:
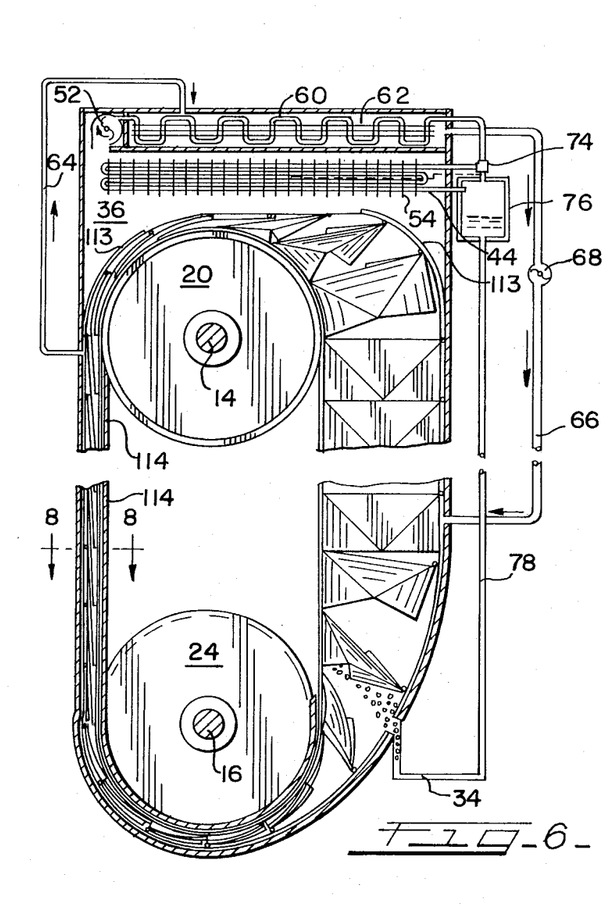
FIG. 6 is a sectional view of a fourth embodiment of the present invention including collapsible buckets.

The gas flow and the folding action of the collapsible buckets 112 can be best described with reference to FIG. 6. The collapsible buckets are box-shaped and are adapted to open after rotating about the lower sprockets 24 and being filled with gas from the inlet tube 34. The pressure of the gas flow into the enclosure should be sufficient to prevent the liquid from entering the inlet tube 34. The valve 74 performs that function and prevents liquid backflow caused by a decrease in the gas pressure. The collapsible buckets nest together on the ascending side of the enclosure 10 (as indicated by the counterclockwise direction of the bucket rotation) and fold flat to a closed position upon rotating about the upper sprockets 20 and engaging a curved panel 113 secured to the inner wall of the enclosure adjacent the upper sprockets 20. A vertical panel 114 parallel and adjacent to the opposite wall 115 of the enclosure divides the enclosure into an ascending and a descending side. The collapsible buckets remain in the closed position while passing through the descending side of the enclosure in the space between the vertical panel 114 and the opposite wall 115.

The use of collapsible buckets has several advantages over the use of rigid buckets. For example, means to replace the gas with liquid as the collapsible buckets round the upper sprockets 20 need not be provided because as each bucket folds to the closed position, the gas (or liquid) is forced from that bucket. In addition, when the collapsible bucket enters the descending side of the enclosure, the total bucket surface area exposed to the liquid is decreased and the folded bucket forms a streamlined surface so that the friction or drag of the bucket moving through the liquid is also decreased.

The collapsible bucket should be formed of a material that will fold easily and wear well; for example, a polyethylene resin or a reinforced rubber composition. The walls of the collapsible buckets are thin to facilitate molding, but have enough strength to withstand the buoyant forces of the gas. The number of folds in each bucket should be minimized since each fold constitutes a wear point and can shorten the useful life of the bucket. In addition, a large number of folds could lead to erratic folding and could form pockets between folds which trap gas when the bucket is closed rather than permit the gas to exit from the bucket.

Figure 7:
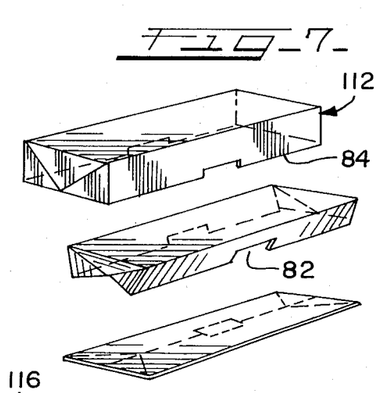
FIG. 7 shows the folding of a collapsible bucket.

The folding technique must be adaptable to rapid bucket opening and closing. One such technique is shown in FIG. 7. As illustrated, the walls of the collapsible bucket fold inwardly to form a compact structure. The bucket 112 is shown with a displacement port 82 extending along part of the bottom edge 84 of a bucket side (the outermost side when the bucket is secured within the apparatus) and a displacement port 82 extending along the entire innermost bucket side to provide clearance for an adjacent bucket as the buckets round the upper and lower sprocket 20 and 24. Reserve chambers 42 could be formed in the collapsible buckets but would increase the size of the folded structure. Liquid entry valves are not necessary in the collapsible buckets.

The collapsible buckets 112 can also include bracing cords (not shown) which assist in maintaining opposite sides of each bucket parallel when the bucket is filled with gas. The pressure within a bucket may tend to overextend or bulge the bucket sides. This would produce additional friction and turbulence as the buckets pass through the liquid. The bracing cord is a strong, flexible, non-stretching member that is connected along a bucket side to the top rear surface and the bottom front side of the bucket to keep opposite bucket sides parallel to each other and perpendicular to the bottom edge 84 of each bucket. When the collapsible bucket closes, the bracing cord folds into the bucket. The ends of the bracing cord can be secured to the bucket by conventional means.

The collapsible buckets 112 are secured along the innermost wall of each bucket to flat belts 116 (rather than to the roller-type chains 26 of FIGS. 1 and 2) which engage the upper and lower sprockets 20 and 24. The flat belts 116 can be cogged to provide a positive traction as the sprockets rotate.

Figure 8:
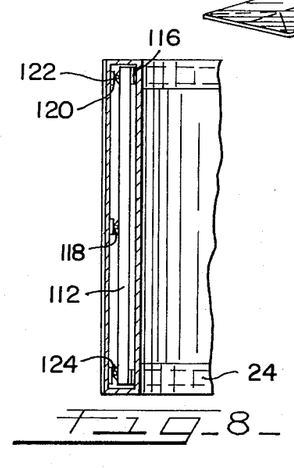
FIG. 8 is a sectional view taken along the line 8—8 of FIG. 6.

Referring to FIG. 8, when the collapsible buckets rotate about the upper sprockets 20, a series of roller assemblies 118 along the top outer edge of each bucket 112 engage a closing cam 120 on the outer wall of the descending side of the enclosure. A roller assembly 118 comprises a ball 122 mounted in a housing 124 having a circular opening 126 with a diameter slightly greater than the diameter of the ball 122 to rotatably mount the ball 122 in the housing 124. Sufficient clearance must be provided so that the ball 122 can freely rotate within the housing 124. The roller assembly can also comprise a cylinder (not shown) in a housing that extends along the top outer edge of each bucket to engage the closing cam 120 in a like manner. The roller assemblies reduce the friction between the enclosure and the bucket 112 particularly as the bucket enters the descending side of the apparatus to increase the life of the bucket.

The closing action of the collapsible bucket has an additional advantage over the use of rigid buckets. As a bucket collapses or folds, the center of gravity of the bucket is moved closer to the plane of the continuous chain or belts to reduce the centrifugal forces which tend to separate the belts from the sprockets as the buckets revolve about the sprockets. This effect can be important particularly at high speeds of rotation.

In each embodiment described, the bucket pitch or the distance between buckets as measured from bucket center to bucket center must permit the buckets to nest or fit together so that there is a minimal gap between adjacent buckets. The bucket pitch also determines the clearance between buckets upon rotation about the sprockets 20 and 24. The nesting configuration restricts the movement of each bucket about the joint connecting the chain and bucket to minimize the horizontal motion of the chain. This increases the efficiency of the apparatus, especially at higher speeds of chain rotation.

It will be understood that various changes and modifications can be made in the above described embodiments of the invention without departing from the spirit thereof, particularly as defined in the following claims.

What is claimed is:

1. An apparatus for converting the potential energy of a gas buoyant within a liquid into rotating mechanical energy comprising:
   (a) rotating means supported by an enclosed frame including at least two upper and lower sprockets freely rotatable about shafts mounted within said frame and being at least partially immersed within the liquid, each of said upper and lower sprockets supporting a continuous chain for movement about a horizontal axis of rotation;
   (b) a plurality of adjacent buckets immersed in the liquid and coupled to said continuous chains such that the buckets are equidistant and each bucket is in close proximity with an adjacent bucket to nest within said adjacent bucket for streamlined vertical movement about the horizontal axis of rotation;
   (c) means for compressing the gas that flows from the buckets upon rotation about the upper sprockets to produce a heated, pressurized gas;
   (d) means in operative communication with said compressing means for condensing the heated, pressurized gas to produce a cooled, liquified gas; and
   (e) means in communication with said condensing means for circulating the cooled, liquified gas to generate said gas within said enclosed frame
   whereby upon filling each bucket with a volume of said gas to displace the liquid from each bucket, the buckets move through the liquid with minimal turbulence and revolve the rotating means about the horizontal axis of rotation to generate power and the gas can be pressurized, condensed and vaporized for recirculation through the apparatus.

2. An apparatus for converting the potential energy of a gas buoyant within a liquid into rotating mechanical energy comprising:
   (a) rotating means supported by an enclosed frame divided by a vertical member to provide first and second enclosed columns containing the liquid, the first column having a substantially larger crosssection than the second column, both columns having open upper ends within the enclosed frame, said rotating means including at least two upper and lower sprockets freely rotatable about shafts mounted on said frame, the lower sprockets being at least partially immersed within the liquid, each of said upper and lower sprockets supporting a continuous belt for movement about a horizontal axis of rotation; and
   (b) a plurality of adjacent collapsible buckets immersed in the liquid and coupled to said continuous belts such that the buckets, when opened and filled with the gas, are equidistant and each bucket is in close proximity with an adjacent bucket to nest within said adjacent bucket for streamlined vertical movement through the liquid, but said buckets can be folded into a flat configuration;
   (c) means for compressing the gas that flows from the buckets upon rotation about the upper sprockets to produce a heated, pressurized gas;
   (d) means in operative communication with said compressing means for condensing the heated, pressurized gas to produce a cooled, liquified gas; and
   (e) means in communication with said condensing means for circulating the cooled, liquified gas to generate said gas within said enclosed frame,
   whereby upon filling each bucket with a volume of said gas to displace the liquid from each bucket, the buckets move through the liquid with minimal turbulence and revolve the rotating means about the horizontal axis of rotation to generate power, the movement of the buckets causing the liquid to flow from the second column into the first column to decrease the resistance to flow of said buckets through said second column, and the gas can be pressurized, condensed and vaporized for recirculation through the apparatus.

3. An apparatus in accordance with claim 1 or claim 2 wherein the enclosed frame is partially filled with liquid and includes a space containing the gas at the upper end thereof whereby control of the pressure of the gas within said space determines the buoyant forces acting on said buckets.

4. An apparatus in accordance with claim 3 including second condensing means within said space in operative communication with said first condensing means by said circulating means to condense the gas after displacement from the buckets but before flow into said compressing means.

5. An apparatus in accordance with claim 4 wherein said circulating means comprises pump means and valve means in communication with said first and second condensing means and said enclosed frame to control the flow of gas with the apparatus.

6. An apparatus in accordance with claim 4 wherein second condensing means includes a thermostat to control said valve means.

7. An apparatus in accordance with claim 1 or claim 2 wherein the edge of the open end of the bucket includes a cutaway section which facilitates fluid displacement from the bucket as said bucket revolves about the sprocket.

8. An apparatus in accordance with claim 1 or claim 2 wherein each bucket includes valve means coupled to an opening in the side of the bucket, said valve means being adapted to engage a cam means mounted to said frame adjacent to said upper sprockets for reciprocal movement relative to the opening whereby when said valve means engages the cam means the liquid can pass through the opening and into the bucket to displace the gas from the buckets.

9. An apparatus in accordance with claim 1 or claim 2 including adjustment means positioned adjacent to one of the shafts to move said shaft relative to another shaft whereby the chain or belt can be tightened or loosened.

* * * * *